United States Patent [19]

Yajima

[11] Patent Number: 4,709,325

[45] Date of Patent: Nov. 24, 1987

[54] LOOSELY COUPLED MULTIPROCESSOR SYSTEM CAPABLE OF TRANSFERRING A CONTROL SIGNAL SET BY THE USE OF A COMMON MEMORY

[75] Inventor: Seiichi Yajima, Tokyo, Japan

[73] Assignee: NEC Corporation, Tokyo, Japan

[21] Appl. No.: 646,966

[22] Filed: Sep. 4, 1984

[30] Foreign Application Priority Data

Sep. 2, 1983 [JP] Japan .................................. 58-160522

[51] Int. Cl.$^4$ ............................................. G06F 15/16
[52] U.S. Cl. ........................................ 364/200; 371/11
[58] Field of Search ............................... 364/200, 900; 179/18 EE; 371/11, 16, 20; 235/153

[56] References Cited

U.S. PATENT DOCUMENTS

| | | | |
|---|---|---|---|
| 3,557,315 | 1/1971 | Kobus et al. | 371/11 |
| 3,692,989 | 9/1972 | Kandiew | 235/153 |
| 4,050,059 | 9/1977 | Williams et al. | 364/200 |
| 4,212,057 | 7/1980 | Devlin et al. | 364/200 |
| 4,318,173 | 3/1982 | Freedman et al. | 364/200 |
| 4,365,295 | 12/1982 | Katman et al. | 364/200 |
| 4,371,754 | 2/1983 | De et al. | 179/18 EE |
| 4,443,849 | 4/1984 | Ohwada | 364/200 |
| 4,484,275 | 11/1984 | Katzman et al. | 364/200 |
| 4,547,849 | 10/1985 | Louie et al. | 364/200 |
| 4,590,554 | 5/1986 | Glazer et al. | 364/200 |

Primary Examiner—Gary V. Harkcom
Assistant Examiner—Randy W. Lacasse
Attorney, Agent, or Firm—Schwartz, Jeffery, Schwaab, Mack, Blumenthal & Evans

[57] ABSTRACT

In a multiprocessor system comprising a plurality of processor units (11 and 12) which are loosely coupled to one another and which individually carry out processing operations in accordance with control signal sets, respectively, a common memory (15) comprises subareas ($33_1$ and $33_2$) assigned to the processor units and loaded with the control signal sets. Each control signal set is written into each subarea from each main memory (22) included in each processor unit whenever each control signal set is renewed. When a particular one of the processor units falls into disorder and interrupts the processing operation, another of the processor units accesses the subarea assigned to the particular processor unit and loads its main memory with the control signal set of the particular processor unit. Another processor unit thus takes over the processing operation interrupted by the particular processor unit.

2 Claims, 6 Drawing Figures

LOOSELY COUPLED MULTIPROCESSOR SYSTEM CAPABLE OF TRANSFERRING A CONTROL SIGNAL SET BY THE USE OF A COMMON MEMORY

BACKGROUND OF THE INVENTION

This invention relates to a multiprocessor system comprising a plurality of processor units which are loosely coupled to one another.

A conventional loosely coupled multiprocessor system of the type described is disclosed by James A. Katzman in "A Fault-Tolerant Computing System" published on January, 1979 (first revision), by Tandem Computers Inc., Calif. The conventional loosely coupled multiprocessor system comprises a plurality of processor units having independent operating systems and a plurality of peripheral devices used by the processor units in common. At any rate, each of the processor units can individually carry out a processing operation by the use of a set of control signals.

When one of the processor unit falls into disorder as a result of occurrence of a fault, that processor unit interrupts the processing operation thereof. The processor unit may be called a faulty processor unit. Under the circumstances, another of the processor units, namely, a normal processor unit can take over the processing operation interrupted by the faulty processor unit. Thus, the normal processor unit gives relief to the fault of the faulty processor unit.

In order to make another processor unit take over the processing operation of the faulty processor unit, the control signal set should be transferred from the faulty processor unit to the normal processor unit. A transfer circuit may be placed between the processor units for use in transferring the control signal sets therebetween. Inasmuch as a great amount of control signals should be transferred through the transfer circuit, it takes a long time to transfer all of the control signal set from the faulty processor unit to the normal processor unit. As a result, each processor unit is subjected to a heavy overload. Use of the transfer circuit is therefore not practicable.

A method has practically been adopted whereby transfer of the control signal set is carried out during an intermission predetermined in each processing operation. With this method, the processing operation of the normal processor unit should be returned back to the predetermined intermission and reexecuted when one of the processor units falls into disorder. Therefore, the normal processor unit can momentarily take over the processing operation of the faulty processor unit.

SUMMARY OF THE INVENTION

It is an object of this invention to provide a loosely coupled multiprocessor system wherein a normal processor unit is capable of rapidly taking over a processing operation interrupted in a faulty processor unit.

A multiprocessor system to which this invention is applicable includes first and second processor units coupled to each other loosely by a plurality of control signal sets which are renewed with time. Each processor unit carries out a processing operation and produces a fault signal when the processing operation falls into disorder. The fault signal is utilized to make a non-faulty processor unit take over the malfunctioning processing operation. According to this invention, the system comprises a common memory having a first and a second memory area assigned to the first and the second processor units, respectively. The first and the second processor units comprise write-in means for writing the control signal sets of the first and the second processor units in the first and the second memory areas, respectively, whenever each of the control signal sets is renewed. Each of the first and the second processor units comprises access means responsive to the fault signal for accessing a particular one of the first and the second memory areas to read the control signal set written therein. The particular one of the first and the second memory areas is assigned to the processor unit producing the fault signal. Each of the first and the second processor units comprises operation means for carrying out the processing operation in accordance with the control signal set read out of the particular one of the first and the second memory areas.

DESCRIPTION OF THE PREFERRED EMBODIMENTS

Figure 1:
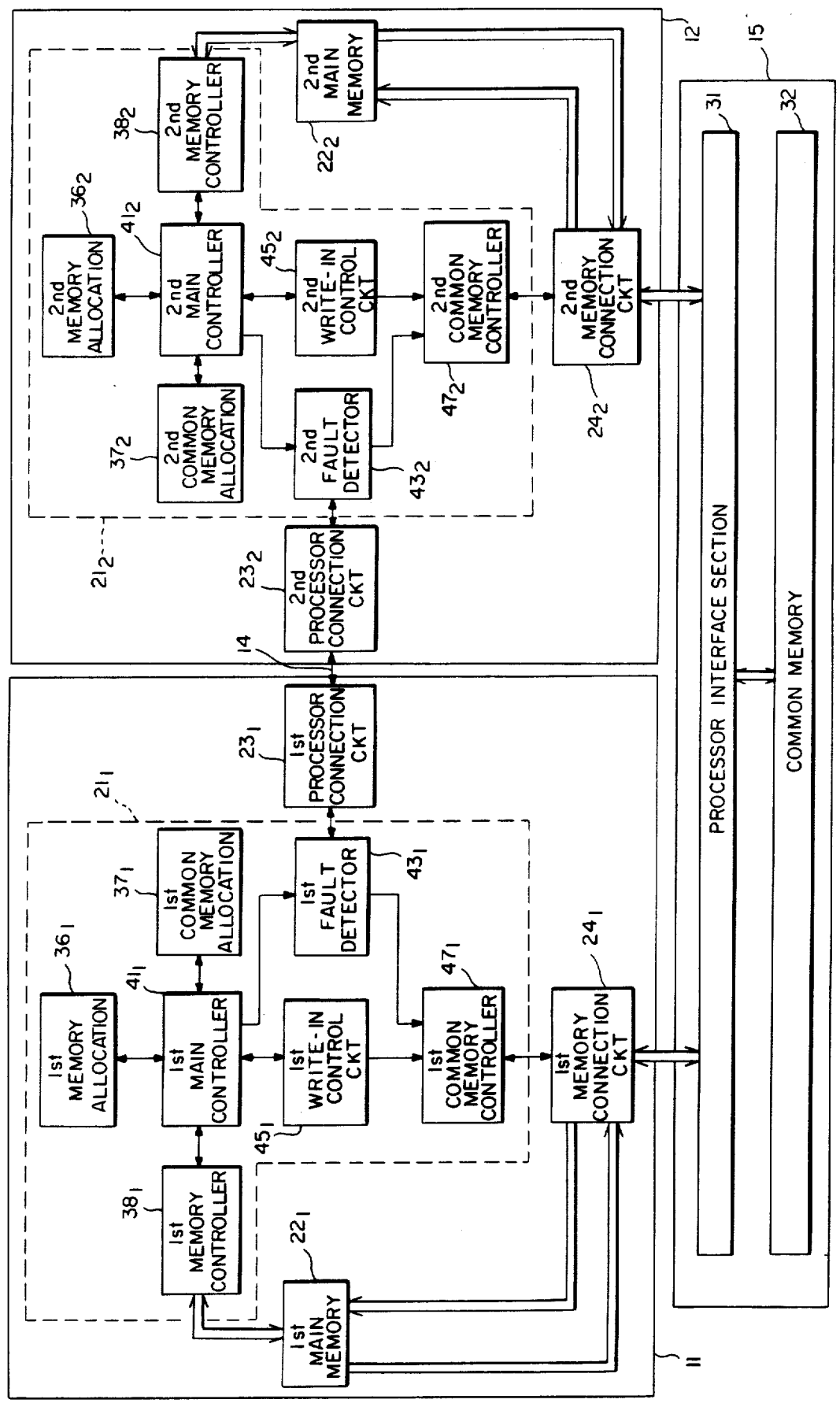
FIG. 1 is a block diagram of a multiprocessor system according to a first embodiment of this invention.

Referring to FIG. 1, a loosely coupled multiprocessor system according to a first embodiment of this invention comprises first and second processor units 11 and 12 which individually have independent operating systems in the manner known in the art. Each of the first and the second processor units 11 and 12 is operable in accordance with a predetermined program which is similar for the processor units 11 and 12. The program of each processor unit 11 and 12 is executed by using a set of control signals variable with time to process a job imposed on each processor unit 11 or 12. Therefore, the control signal sets of the first and the second processor units 11 and 12 are different from each other and will be referred to as first and second control signal sets, respectively. The first and the second processor units 11 and 12 are coupled to each other through a processor interface line 14.

A memory unit 15 is shared by the first and the second processor units 11 and 12 in common and is operable in a manner to be described later. The memory unit 15 may be called a common memory unit having a common memory area.

In FIG. 1, attention will mainly be directed to the first processor unit 11 because each of the first and the second processor units 11 and 12 is similar in structure and operation. Subscripts 1 and the word "first" will be attached to elements and parts of the first processor unit 11 in order to distinguish them from the elements and parts of the second processor unit 12 which will be specified by subscripts 2 and the word "second."

The first processor unit 11 comprises a first control processor $21_1$ for controlling the whole operation of the first processor unit 11 as will become clear as the description proceeds and a first main memory $22_1$ coupled to the first control processor $21_1$ through a bus line (unnumbered).

A first processor connection circuit $23_1$ is interposed between the processor interface line 14 and the first control processor unit $21_1$. A first memory connection circuit $24_1$ is connected between the first processor unit $21_1$ and the common memory 15.

Like the first processor unit 11, the second processor unit 12 comprises a second control processor $21_2$, a second main memory $22_2$, a second processor connection circuit $23_2$, and a second memory connection circuit $24_2$ which correspond to the first control processor $21_1$, the first main memory $22_1$, the first processor connection circuit $23_1$, and the first memory connection circuit $24_1$, respectively.

In FIG. 1, each of the first and the second processor units 11 and 12 individually carries out a processing operation during a normal mode of operation and produces a fault signal in a usual manner when the processing operation falls into disorder (malfunctions) as a result of occurrence of a fault. The fault signal is produced in each control processor $21_1$ and $21_2$ and transferred through the processor interface line 14 between the first and the second processor units 11 and 12. It is possible for the first and the second processor units 11 and 12 to monitor the processing operations of the second and the first processor units 12 and 11, respectively, by detecting the fault signal. A message may be produced during the normal mode from each processor unit so as to indicate the normal mode and may be interrupted on occurrence of the fault. In this event, the interruption of the message serves to indicate occurrence of the fault and may therefore be used as the fault signal.

In the illustrated system, let one of the first and the second processor units 11 and 12 fall into disorder and produce the fault signal. In this case, the processing operation of that processor unit is interrupted and its processing operation is taken over by the other processor unit.

Figure 2:
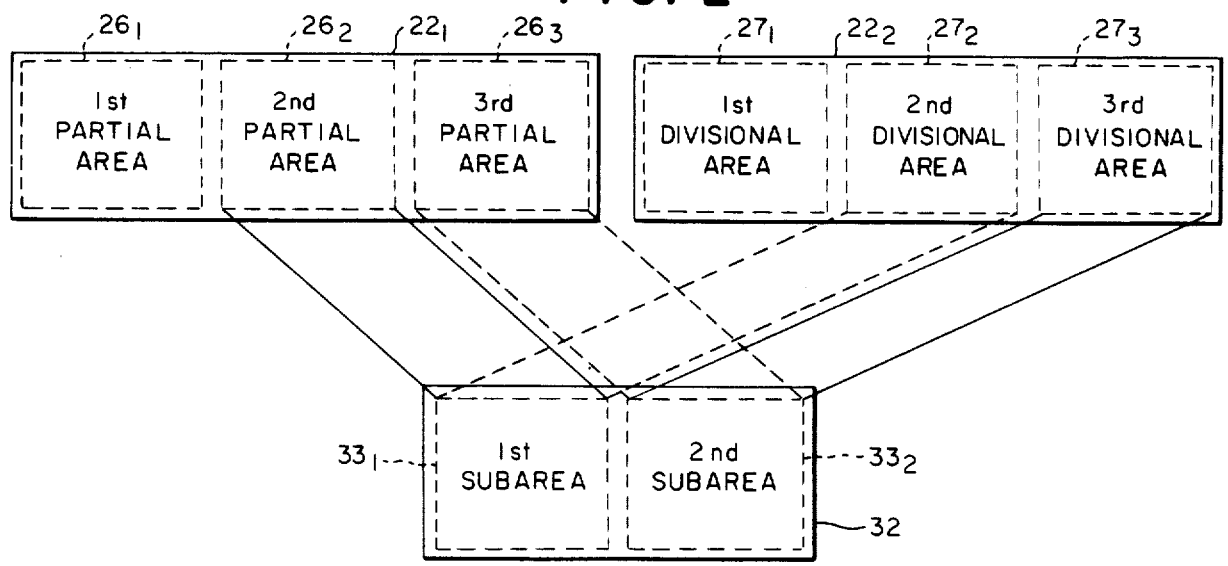
FIG. 2 is a block diagram for use in describing an area allocation of memories used in the multiprocessor system illustrated in FIG. 1.

Referring to FIG. 2 together with FIG. 1, the first main memory $22_1$ has a first memory area divided into first, second, and third partial areas $26_1$, $26_2$, and $26_3$ for storing the program of the first processor unit 11, the first control signal set of the first processor unit 11, and the second control signal set of the second processor unit 12, respectively. The program of the first processor unit 11 which may be called a first program is executed by the use of the first control signal set in the normal mode.

Likewise, the second main memory $22_2$ has a second memory area divided into first, second, and third divisional areas $27_1$, $27_2$, and $27_3$ for storing the program of the second processor unit 12, the first control signal set of the first processor unit 11, and the second control signal set of the second processor unit 12, respectively. The program of the second processor unit 12 may be referred to as a second program and is executed by the use of the second control signal set in the normal mode of the second processor unit 12.

In FIG. 1, the common memory unit 15 comprises a processor interface section 31 (which will be described in detail) and a common memory 32 coupled to the first and the second processor units 11 and 12 through the processor interface section 31. As shown in FIG. 2, the common memory 32 has a common memory area divided into first and second subareas $33_1$ and $33_2$ which are loaded with the first and the second control signal sets, respectively, as suggested by solid lines. This implies that the first control signal set is stored in both of the second partial area $26_2$ and the first subarea $33_1$ and that the second control signal set is stored in both of the third divisional area $27_3$ and the second subarea $33_2$. Under the circumstances, the first control signal set is transferred from the first subarea $33_1$ to the second divisional area $27_2$ when the first processor unit 11 falls into disorder. Similarly, the second control signal set is transferred from the second subarea $33_2$ to the third partial area $26_3$ when the second processor unit 12 falls into disorder.

Each of the first and the second control processors $21_1$ and $21_2$ cooperates with each of the first and the second main memories $22_1$ and $22_2$ so as to carry out the above-mentioned operations. More specifically, the first control processor $21_1$ illustrated in FIG. 1 comprises a first memory allocation controller $36_1$ for allocating the second and the third partial areas $26_2$ and $26_3$ of the first main memory $22_1$ to the first and the second processor units 11 and 12, respectively. The first memory allocation controller $36_1$ monitors an amount of the first program and the first control signal set to effectively carry out the allocation of the first main memory $22_1$. A first common memory allocation controller $37_1$ allocates the first subarea $33_1$ of the common memory 32 to the first processor unit 11. The first subarea $33_1$ of the common area 32 is equal in size to the second partial area $26_2$ of the first main memory $22_1$. A first memory controller $38_1$ is coupled to the first main memory $22_1$ so as to carry out an access control operation of the first main memory $22_1$. The first memory allocation circuit $36_1$, the first common memory allocation controller $37_1$, and the first memory controller $38_1$ are coupled to a first main controller $41_1$ to be put into operation under control of the first main controller $41_1$.

The first main controller $41_1$ detects occurrence of a fault in the first processor unit 11 so as to transmit the fault signal through the first processor connection circuit $23_1$ in the conventional manner and to interrupt the processing operation of the first processor unit 11. The first main controller $41_1$ is coupled to a first fault detector $43_1$ for detecting arrival of a fault signal produced by the second processor unit 12.

A first write-in control circuit $45_1$ is coupled to the first main controller $41_1$ to write the first control signal set in the first subarea $33_1$ of the common memory 32 through a first common memory controller $47_1$, whenever the first control signal set is renewed. The first common memory controller $47_1$ is coupled to the first fault detector $43_1$ to access the common memory unit 15 through the first memory connection circuit $24_1$ in a manner to be described.

The second control processor $21_2$ is similar in structure and operation to the first control processor $21_1$ and therefore comprises a second memory allocation controller $36_2$, a second common memory allocation controller $37_2$, a second memory controller $38_2$, a second main controller $41_2$, a second fault detector $43_2$, a second write-in control circuit $45_2$, and a second common memory controller $47_2$.

Figure 3:
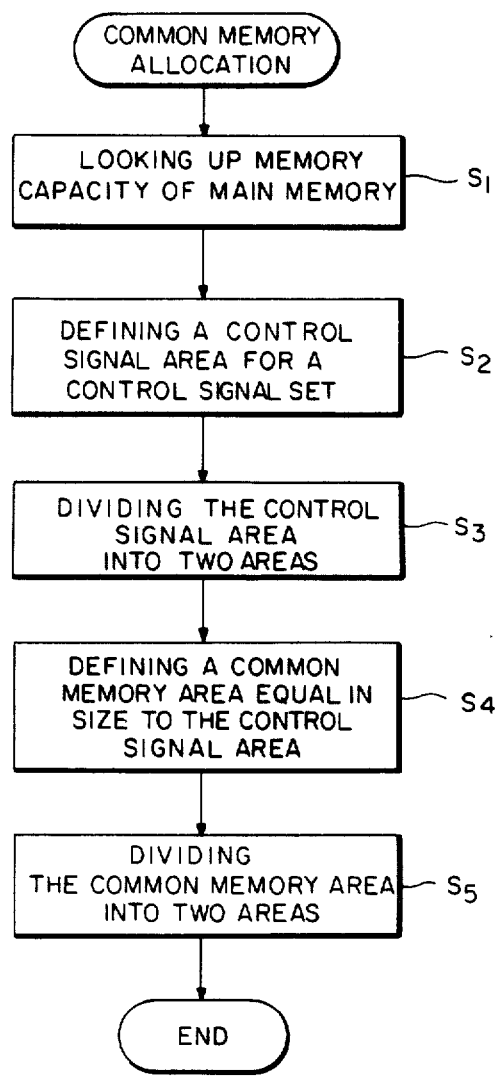
FIG. 3 is a flow chart for use in describing a part of an operation of the multiprocessor system illustrated in FIG. 1.

Referring to FIG. 3 together with FIGS. 1 and 2, each of the first and the second processor units 11 and 12 is energized by the first and the second main controllers $41_1$ and $41_2$ to carry out an allocation operation of the common memory 32 in accordance with procedures shown in FIG. 3. At first, each of the first and the second memory allocation controllers $36_1$ and $36_2$ is enabled to look up a memory capacity of each of the first and the second main memories $22_1$ and $22_2$, as shown at a first step $S_1$. The first partial area $26_1$ and the first divisional area $27_1$ are subtracted from the memory capacities of the first and the second main memories $22_1$ and $22_2$, respectively. As a result, the second and the third partial areas $26_2$ and $26_3$ and the second and the third divisional areas $27_2$ and $27_3$ are determined in the first and the second main memories $22_1$ and $22_2$ so as to store the first and the second control signal sets, respectively. Thus, each of the first and the second memory allocation controllers $36_1$ and $36_2$ defines a control signal area for each control signal set in each of the first and the second main memories $22_1$ and $22_2$, as shown at a second step $S_2$.

The second step $S_2$ is followed by a third step $S_3$ at which each of the first and the second memory allocation controllers $36_1$ and $36_2$ equally divides each control signal area into two areas, such as the second and the third partial areas $26_2$ and $26_3$ and the second and the third divisional areas $27_2$ and $27_3$.

Upon completion of the third step $S_3$ in each of the first and the second memory allocation controllers $36_1$ and $36_2$, the first and the second main controllers $41_1$ and $41_2$ enable the first and the second common memory allocation controllers $37_1$ and $37_2$, respectively. Each common memory allocation controller $37_1$ and $37_2$ assigns the common memory 32 to both of the first and the second control signal sets. Thus, the common memory area is defined on the common memory 32 at a fourth step $S_4$ for the first and the second control signal sets. The common memory area is equal in size to the control signal area on each of the first and the second main memories $22_1$ and $22_2$. At a fifth step $S_5$, the common memory area is equally divided into the first and the second subareas $33_1$ and $33_2$ assigned to the first and the second control signal sets, respectively.

After completion of the fifth step $S_5$, each of the first and the second processor units 11 and 12 individually carries out the processing operation. When each of the first and the second control signal sets is renewed during the processing operation, the first and the second write-in control circuits $45_1$ and $45_2$ carry out write-in operations of writing the first and the second control signal sets in the common memory unit 15, respectively.

Figure 4:
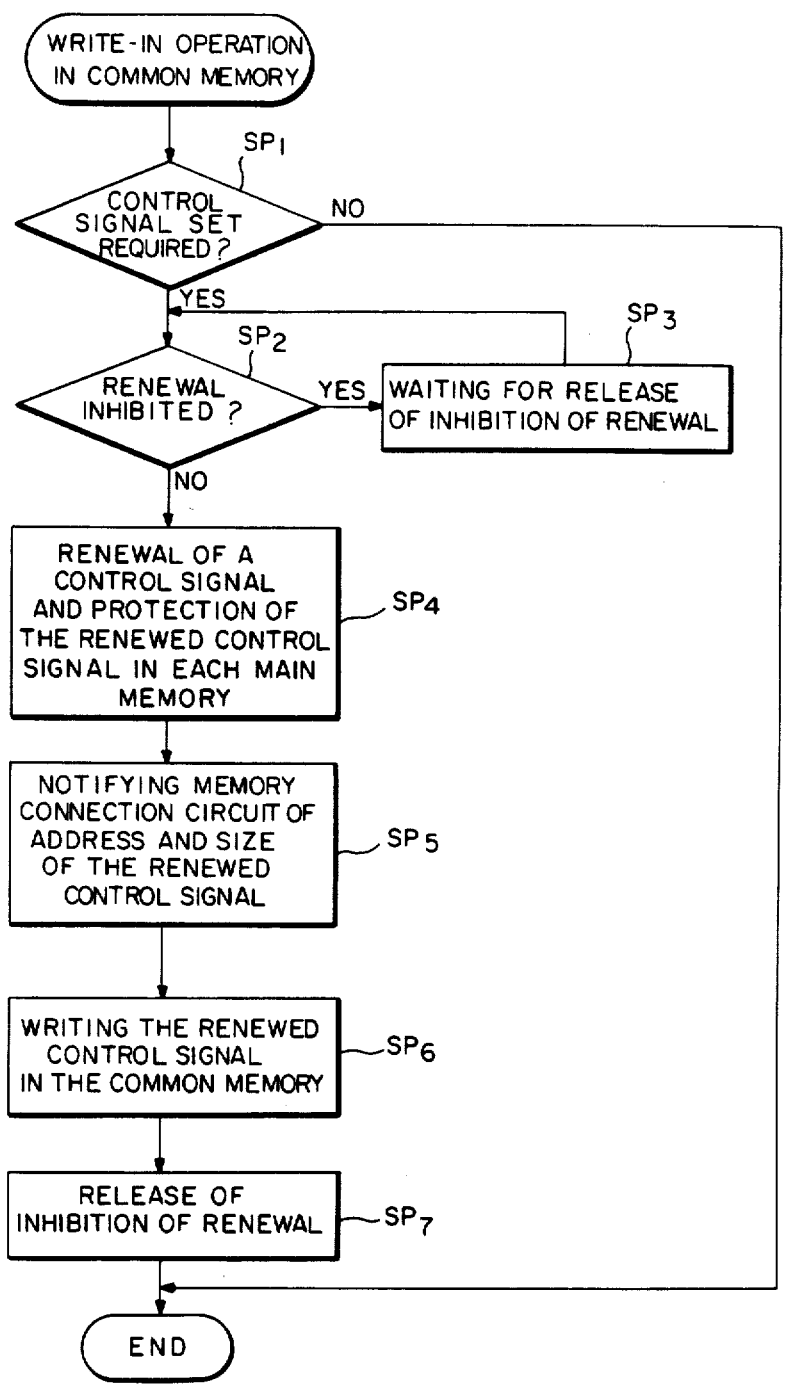
FIG. 4 is a flow chart for use in describing another part of the operation of the multiprocessor system illustrated in FIG. 1.

Referring to FIG. 4 afresh and FIG. 2 again, the first and the second write-in control circuits $45_1$ and $45_2$ monitor, through the first and the second main controllers $41_1$ and $41_2$, whether or not the first and the second control signal sets are renewed, respectively, as shown at a first step $SP_1$. If each control signal set is not renewed, the write-in operation comes to an end. Otherwise, the first step $SP_1$ is followed by a second step $SP_2$. It may be mentioned here that renewal of a control signal should be inhibited while renewal operation of the control signal is carried out in each main memory. Under the circumstances, each of the first and the second write-in control circuits $45_1$ and $45_2$ detects whether or not renewal is inhibited about each control signal of the first and the second control signal sets, as shown at a second step $SP_2$.

If the renewal is inhibited, a third step $SP_3$ succeeds the second step $SP_2$ to wait for release of the inhibition of renewal. If renewal of the control signal under consideration is not inhibited, each of the first and the second write-in control circuits $45_1$ and $45_2$ renews the control signal in question and protects the renewed control signal from being renewed in each of the main memories $22_1$ and $22_2$, as shown at a fourth step $SP_4$.

After the fourth step $SP_4$, a fifth step $SP_5$ is carried out by each of the common memory controllers $47_1$ and $47_2$ to notify each memory connection circuit $24_1$ or $24_2$ of an address and a size of the renewed control signal. Each of the memory connection circuit $24_1$ and $24_2$ energizes each main memory $22_1$ or $22_2$ and the processor interface section 31 of the common memory unit 15 to write the renewed control signal in the common memory 32, as shown at a sixth step $SP_6$. In this event, the renewed control signal of the first processor unit 11 is sent from the first main memory $22_1$ to the first subarea $33_1$ while the renewed control signal of the second processor unit 12 is sent from the second main memory $22_2$ to the second subarea $33_2$ in the manner described above in conjunction with FIG. 2. When the renewed control signal is stored in the common memory 32, each of the write-in control circuit $45_1$ and $45_2$ releases inhibition of renewal of the renewed control signal, as shown at a seventh step $SP_7$. Thus, the inhibition of renewal is released after contents of each main memory are coincident with those of the common memory 32.

Figure 5:
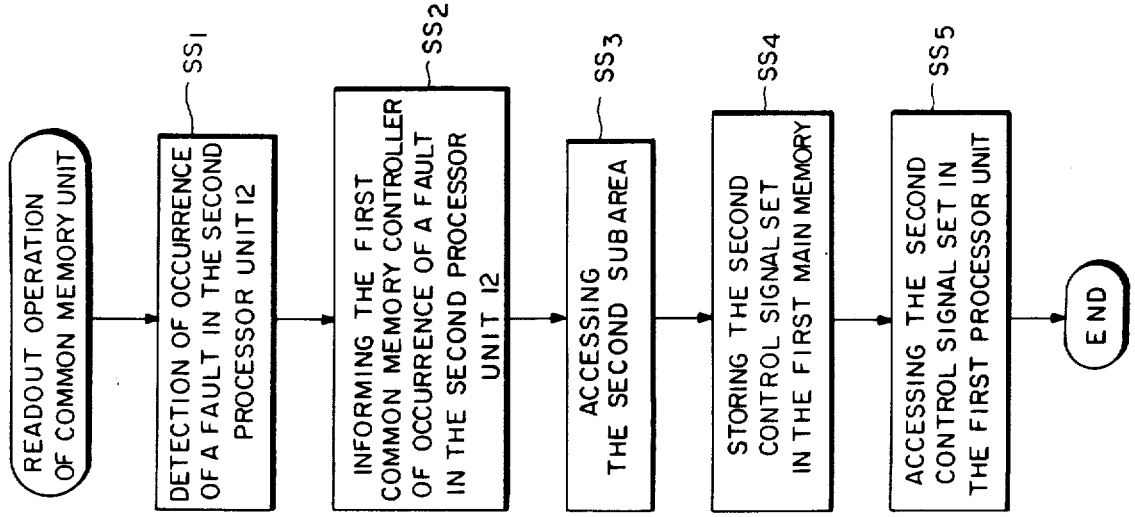
FIG. 5 is a flow chart for use in describing an additional part of the operation of the multiprocessor system.

Referring to FIG. 5 anew together with FIG. 2, the common memory unit 15 is accessed for readout of the contents from the common memory unit 15 when a fault occurs in either one of the first and the second processor units 11 and 12. For brevity of description, let the fault have occurred in the second processor unit 12. The first processor unit 11 takes over the processing operation of the second processor unit 12. In this case, occurrence of the fault is detected in the second processor unit 12 in a usual manner and is transmitted as the fault signal from the second processor connection circuit $23_2$ to the first fault detector $43_1$ through the processor interface line 14 and the first processor connection circuit $23_1$.

Responsive to the fault signal, the first fault detector $43_1$ detects the occurrence of the fault in the second processor unit 12, as shown at a first stage $SS_1$ to inform the first common memory controller $47_1$ of the occurrence of the fault in the second processor unit 12, as shown at a second stage $SS_2$. The first common memory controller $47_1$ accesses the second subarea $33_2$ of the common memory 32 through the first memory connection circuit $24_1$, as shown at a third stage $SS_3$, when the second processor unit 12 falls into disorder. Thus, the second subarea $33_2$ assigned to the second processor unit 12 is accessed by the first processor unit 11 which does not produce any fault signal. As a result, the second control signal set is read out of the second subarea $33_2$ to be sent through the first memory connection circuit $24_1$ to the third partial area $26_3$ of the first main memory $22_1$, as shown at a fourth stage $SS_4$. From the above, it is readily understood that a combination of the first fault detector $43_1$ and the first common memory controller $47_1$ serves to access the second subarea $33_2$ in response to the fault signal sent from the second processor unit 12 and may be called an access circuit.

The second control signal set is rapidly transferred from the second subarea $33_2$ to the third partial area $26_3$.

The second control signal set stored in the third partial area $26_3$ is accessed by the first memory controller $38_1$ under control of the first main controller $41_1$ together with the first control signal set stored in the second partial area $26_2$, as shown at a fifth stage $SS_5$. Thus, the first processor unit 11 deals with the second control signal set as a part of its own control signal set. The first memory controller $38_1$ and the first main controller $41_1$ are operable to carry out the processing operation of the second processor unit 12 in accordance with the second control signal set read out of the second subarea $33_2$. Inasmuch as the second control signal set is accessed by the first memory controller $38_1$, it is possible to carry out the processing operation interrupted in the second processing unit 12. Thus, the first processor unit 11 takes over the processing operation of the second processor unit 12.

Similar operation is possible when the fault occurs in the first processor unit 11 with the second processor unit 12 operated in the normal mode.

Figure 6:
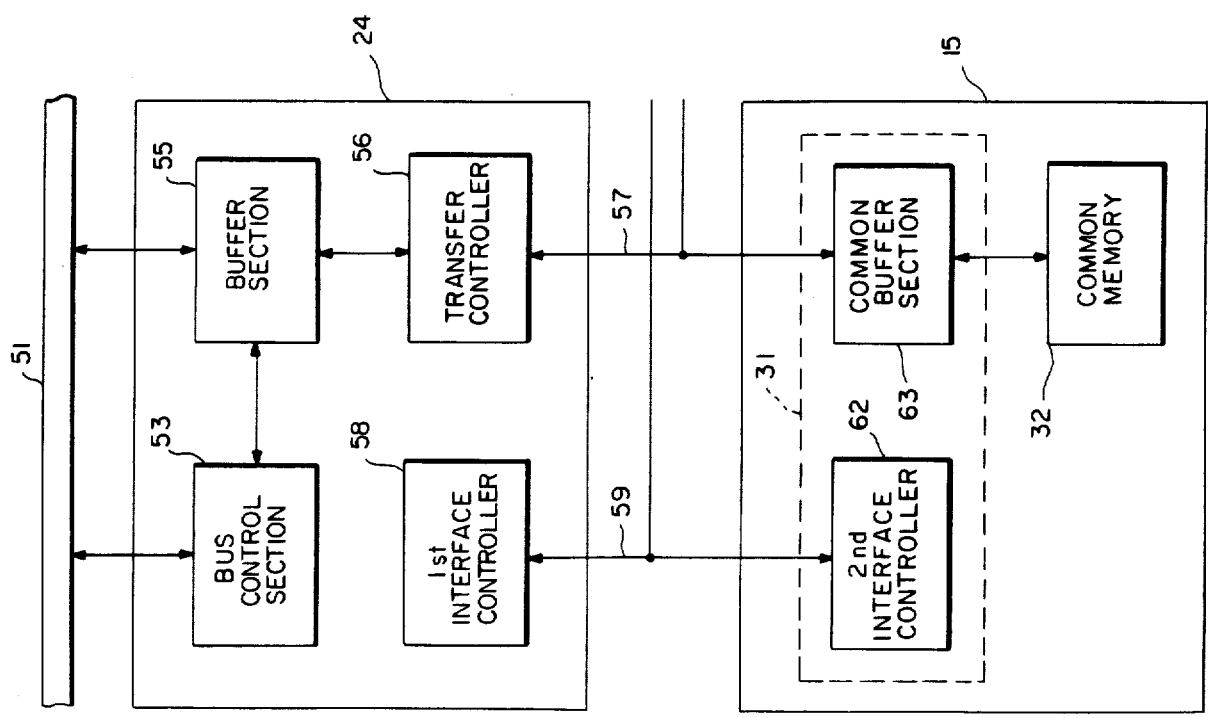
FIG. 6 is a block diagram for use in describing a part of the multiprocessor system.

Referring to FIG. 6, a common memory connection circuit denoted by 24 is usable as each of the first and the second common memory connection circuits $24_1$ and $24_2$ and is coupled to the main memory 22 (subscripts omitted) and to the control processor 21 of each processor unit through a bus indicated at 51. The illustrated common memory connection circuit 24 comprises a bus control section 53 for carrying out an interface control operation so as to couple the control processor 21 with the common memory connection circuit 24. A buffer section 55 is for keeping or storing each control signal or each control signal set to carry out transfer operation between the common memory unit 15 and each processor unit in the manner described before. The bus control section 53 monitors an address of each control signal and the number of bytes to be transferred onto the bus 51. Each control signal or each control signal set stored in the buffer section 55 is transferred to the common memory unit 15 under control of a transfer controller 56 coupled to a first signal interface which is denoted by 57 and is common to both of the first and the second processor units 11 and 12.

In addition, a first interface controller 58 is included in the illustrated common memory connection circuit 24 and is connected to a second signal interface 59 which is common to both of the first and the second processor units 11 and 12.

In FIG. 6, the common memory unit 15 comprises a second interface controller 62 connected through the second signal interface 59 to the first interface controller 58 of each processor unit. A common buffer section 63 is connected through the first signal interface 57 to the transfer controller 56 of each processor unit. Both of the second interface controller 62 and the common buffer section 63 are operable as the processor interface section 31. The second signal interface 59 is controlled by the second interface controller 58 and each first interface controller 58 to determine a specific one of the processor units that can be coupled to the common memory 32. Each control signal or signal set is sent from the specific processor unit through the first signal interface 57 to the common buffer section 63 and is thereafter stored in a specific one of the first and the second subareas $33_1$ and $33_2$ that is assigned to the specific processor unit. To the contrary, each control signal or signal set is read out of the specific subarea and is delivered through the common buffer section 63 and the first signal interface 57 to the buffer section 55 of another one of the first and the second processor units 11 and 12.

While this invention has thus far been described in conjunction with a preferred embodiment thereof, it will readily be possible for those skilled in the art to change the preferred embodiment to various other embodiments of the invention. For example, the processor units may be greater in number than two. In this event, the processor units are consecutively numbered to be divided into an odd number group and an even number one. The first and the second subareas $33_1$ and $33_2$ of the common memory 32 are assigned to the odd and the even number groups. In addition, the control signal area of each main memory is divided into two areas assigned to the odd and the even number groups. Thus, the second and the third partial areas $26_2$ and $26_3$ (FIG. 2) or the second and the third divisional areas $27_1$ and $27_2$ may be assigned to the odd and the even number groups. The control signal set includes operation codes, such as commands, instructions, and the like.

What is claimed is:

1. A multiprocessor system including first and second processor units which are loosely coupled to each other and which comprise first and second main memories, respectively, each processor unit carrying out a processing operation and producing a fault signal when said processing operation falls into disorder, said fault signal being received by a normal one of said first and said second processor units that does not produce said fault signal and being for making said normal one of the first and the second processing units take over the processing operation falling into disorder, said first and said second main memories comprising:

first and second program areas for storing first and second programs executed in said first and said second processor units, first and second control signal areas for storing first and second sets of control signals which are used as primary control signals in said first and said second processor units and each of which is renewed with time, and first and second additional control signal areas for storing said second and said first sets of the control signals, respectively;

said multiprocessor system further comprising:

a common memory having first and second memory areas assigned to said first and said second processor units, respectively;

said first and said second processor units comprising:

write-in means for writing said first and said second sets of the control signals in said first and said second memory areas whenever said first and said second sets of the control signals are renewed in said first and said second main memories, respectively;

each of said first and said second processor units comprising:

access means responsive to said fault signal for accessing a particular one of said first and said second memory areas to read the control signal set written therein, said particular one of the first and the second memory areas being assigned to the processor unit producing said fault signal; and operation means for carrying out the processing operation with reference to the control signal set read out of said particular one of the first and the second memory areas in addition to each of said primary control signals.

2. A multiprocessor system comprising a plurality of processor units which are loosely coupled to one another and each of which comprises a main memory, a first one of said processor units being a normal, non-malfunctioning processing unit and taking over processing operations of a second one of said processor units in response to a fault signal representative of a fault occurring in said second one of the processor units, said main memories of the first and the second ones of the processor units comprising:

first and second program areas for storing first and second programs executed in said first and said second processor units, first and second control signal areas for storing first and second sets of control signals which are used in said first and said second processor units and each of which is renewed with time, and first and second additional control signal areas for storing said second and said first sets of the control signals, respectively;

said multiprocessor system further comprising:

a common memory accessible by said processor units in common and having a first and a second memory area assigned to said first and said second processor units, respectively;

said first and said second processor units comprising:

write-in means for writing said first and said second sets of the control signals into said first and said second memory areas, respectively, whenever each of said control signal sets is renewed;

said first processor unit comprising:

access means responsive to said fault signal for accessing said second memory area to read the second set of the control signals; and means for carrying out said processing operations of said second processor unit with reference to said second set of the control signals read out of said second memory area in addition to processing operations with reference to said first set of the control signals.

* * * * *